United States Patent
Deo et al.

(10) Patent No.: US 8,162,324 B2
(45) Date of Patent: Apr. 24, 2012

(54) COMPLIANT PLATE SEAL WITH AN ANNULAR RING FOR TURBOMACHINERY AND METHODS OF ASSEMBLING THE SAME

(75) Inventors: Hrishikesh Vishvas Deo, Guilderland, NY (US); Norman Arnold Turnquist, Sloansville, NY (US); Frederick George Baily, Ballston Spa, NY (US); Bernard Arthur Couture, Jr., Schenectady, NY (US); Sean Douglas Feeny, Ballston Spa, NY (US); William Edward Adis, Scotia, NY (US); Shorya Awtar, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 652 days.

(21) Appl. No.: 12/032,929

(22) Filed: Feb. 18, 2008

(65) Prior Publication Data

US 2008/0131269 A1      Jun. 5, 2008

Related U.S. Application Data

(63) Continuation-in-part of application No. 11/504,061, filed on Aug. 15, 2006, now Pat. No. 7,419,164.

(51) Int. Cl.
 *F16J 15/447* (2006.01)
 *F16J 15/44* (2006.01)
(52) U.S. Cl. ........................................ 277/413; 277/417
(58) Field of Classification Search .................. 277/413, 277/417, 355
 See application file for complete search history.

(56) References Cited

U.S. PATENT DOCUMENTS

| | | | |
|---|---|---|---|
| 5,135,237 A | 8/1992 | Flower | |
| 5,474,306 A | 12/1995 | Bagepalli et al. | |
| 5,749,584 A | 5/1998 | Skinner et al. | |
| 5,961,280 A | 10/1999 | Turnquist et al. | |
| 5,971,400 A * | 10/1999 | Turnquist et al. | 277/416 |
| 6,010,132 A | 1/2000 | Bagepalli et al. | |
| 6,027,121 A | 2/2000 | Cromer et al. | |
| 6,030,175 A | 2/2000 | Bagepalli et al. | |
| 6,131,910 A | 10/2000 | Bagepalli et al. | |
| 6,257,586 B1 | 7/2001 | Skinner et al. | |
| 6,267,381 B1 | 7/2001 | Wright | |
| 6,318,728 B1 | 11/2001 | Addis et al. | |
| 6,343,792 B1 | 2/2002 | Shinohara et al. | |
| 6,553,639 B2 | 4/2003 | Hobbs et al. | |
| 6,840,519 B2 * | 1/2005 | Dinc et al. | 277/413 |
| 6,860,484 B2 | 3/2005 | Urlichs | |
| 6,874,788 B2 | 4/2005 | Kono | |
| 6,935,631 B2 * | 8/2005 | Inoue | 277/355 |
| 6,976,680 B2 * | 12/2005 | Uehara et al. | 277/355 |
| 7,032,903 B1 | 4/2006 | Dalton et al. | |
| 7,066,468 B2 | 6/2006 | Uehara et al. | |
| 7,159,872 B2 * | 1/2007 | Nicholson et al. | 277/355 |
| 7,201,378 B2 | 4/2007 | Kono | |
| 7,226,053 B2 * | 6/2007 | Nakano et al. | 277/355 |
| 7,419,164 B2 * | 9/2008 | Awtar et al. | 277/418 |

(Continued)

*Primary Examiner* — Alison Pickard
(74) *Attorney, Agent, or Firm* — Armstrong Teasdale LLP

(57) ABSTRACT

A method of assembling a turbomachine that includes a rotor and a stationary component is provided. The method includes coupling a housing to the stationary component using at least one biasing member, wherein the housing extending circumferentially about the rotor. The method also includes coupling at least one annular ring to the housing, and coupling a plurality of plate members to the housing such that the at least one annular ring extends from the housing towards the rotor and partially through the plurality of plate members.

18 Claims, 5 Drawing Sheets

U.S. PATENT DOCUMENTS

| | | | |
|---|---|---|---|
| 7,651,101 B2 * | 1/2010 | Awtar et al. | 277/412 |
| 2003/0062686 A1 * | 4/2003 | Uehara et al. | 277/411 |
| 2004/0256810 A1 | 12/2004 | Nakano et al. | |
| 2006/0033285 A1 | 2/2006 | Nishimoto et al. | |
| 2006/0208427 A1 | 9/2006 | Wright et al. | |
| 2006/0210392 A1 | 9/2006 | Enderby | |
| 2007/0018408 A1 * | 1/2007 | Kono | 277/355 |

* cited by examiner

COMPLIANT PLATE SEAL WITH AN ANNULAR RING FOR TURBOMACHINERY AND METHODS OF ASSEMBLING THE SAME

CROSS REFERENCE TO RELATED APPLICATIONS

This application is a continuation-in-part of U.S. patent application Ser. No. 11/504,061 filed Aug. 15, 2006 now U.S. Pat. No. 7,419,164, which is assigned to the same assignee of the present invention, and which is hereby incorporated by reference in its entirety.

BACKGROUND OF THE INVENTION

This invention relates generally to a sealing structure between a rotating component and a stationary component and, more particularly, to a compliant plate seal arrangement that uses features of a labyrinth seal.

Dynamic sealing between a rotor (e.g., rotating shaft) and a stator (e.g., static shell or casing) is an important concern in turbomachinery. Several methods of sealing have been used. In particular, sealing based on flexible members has been used that include seal members such as compliant plate seals and/or brush seals.

Known brush seals include tightly-packed, generally cylindrical bristles that are arranged in a staggered arrangement to reduce leakage. The bristles have a low radial stiffness that allows them to move in the event of a rotor excursion while maintaining a tight clearance during steady state operations. Brush seals, however, are generally effective only below a limited pressure differential across the seal. Because of the generally cylindrical geometry of the bristles, the brush seals tend to have a low stiffness in the axial direction, which limits the maximum operable pressure differential in known brush seals to generally less than 400 psi.

In contrast, at least some known compliant plate seals have a plate-like geometry that has a significantly higher axial stiffness for a comparable radial stiffness and therefore such seals have the capability of being used with larger pressure differentials than known brush seals. Axial leakage, however, remains a problem due to packing of the compliant plates from an inner diameter of the seal to an outer diameter of the seal. More specifically, the compliant plates are packed tightly together with very small gaps between adjacent plates and the inner diameter of the seal, but the gaps between adjacent plates may increase close to the outer diameter of the seal since each seal is curved. Such gaps potentially cause leakage and may offset any benefits of the compliant plate seals as compared to the brush seals.

BRIEF DESCRIPTION OF THE INVENTION

In one aspect, a method of assembling a turbomachine that includes a rotor and a stationary component is provided. The method includes coupling a housing to the stationary component using at least one biasing member, wherein the housing extends circumferentially about the rotor. The method also includes coupling at least one annular ring to the housing, and coupling a plurality of plate members to the housing such that the at least one annular ring extends from the housing towards the rotor and partially through the plurality of plate members.

In another aspect, a seal assembly for use with a rotor is provided. The seal assembly includes a housing coupled to a stationary component, at least one biasing member coupled between the housing and the stationary component, and a resistance member coupled to the housing. The resistance member includes at least one annular ring extending from the housing towards the rotor. The seal assembly further includes a plurality of plate members coupled circumferentially about the housing, each of the plate members having a tip, a root, and opposing first and second side surfaces that extend between the tip and the root. The at least one annular ring extends a distance through each of the plurality of plate members from the root towards the tip.

In still another aspect, a turbomachine is provided. The turbomachine includes a stationary component, a rotor coupled adjacent to the stationary component, and a seal assembly coupled between the stationary component and the rotor. The seal assembly includes a housing coupled to the stationary component, a biasing member coupled between the housing and the stationary component, and a resistance member coupled to the housing. The resistance member includes at least one annular ring extending from the housing towards the rotor. The seal assembly further including a plurality of plate members coupled circumferentially about the housing, each of the plate members having a tip, a root, and opposing first and second side surfaces that extend between the tip and the root. The at least one annular ring extends a distance through each of the plurality of plate members from the root towards the tip.

DETAILED DESCRIPTION OF THE INVENTION

Figure 1:
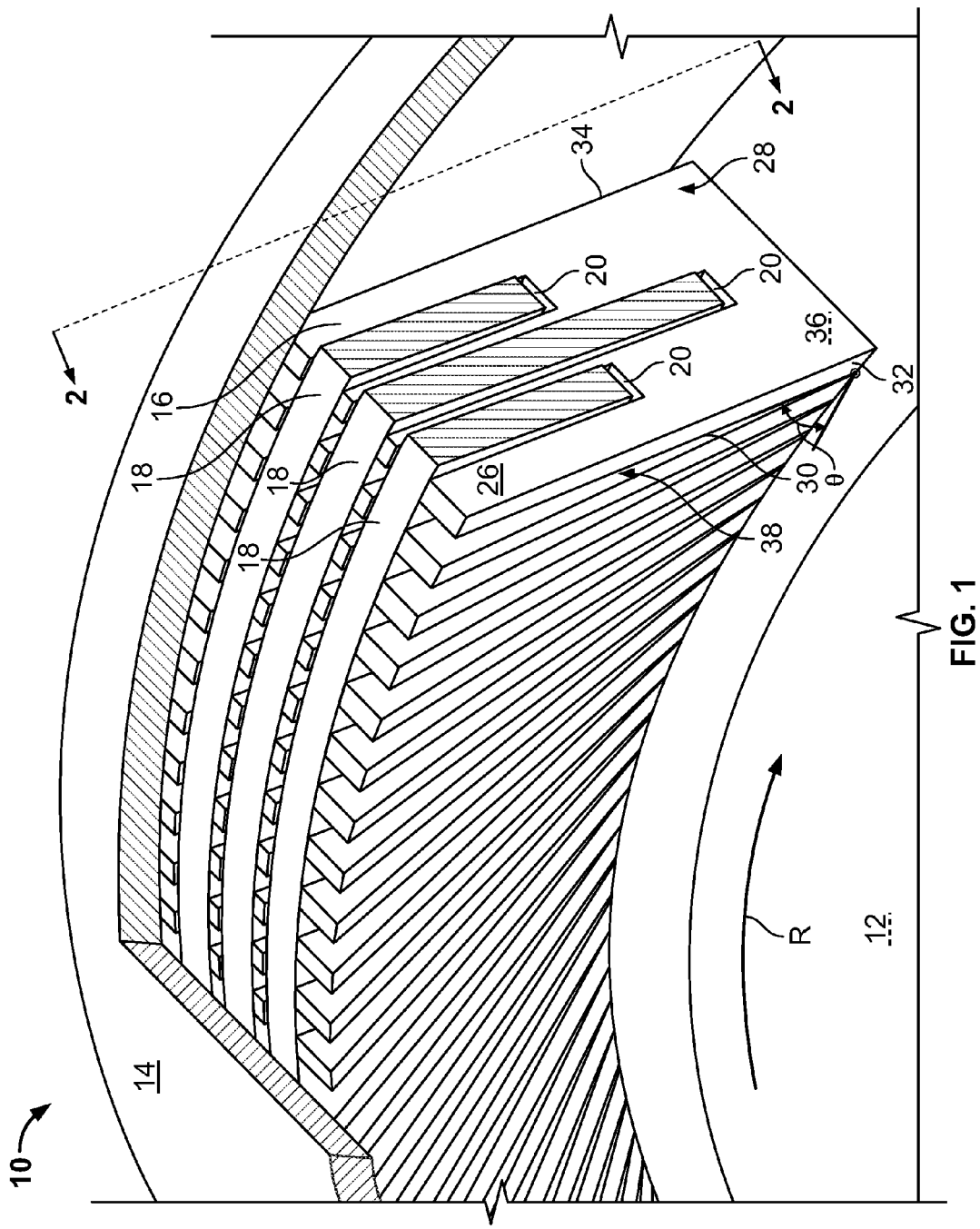
FIG. 1 is a perspective view of an exemplary compliant plate seal assembly.
Figure 2:
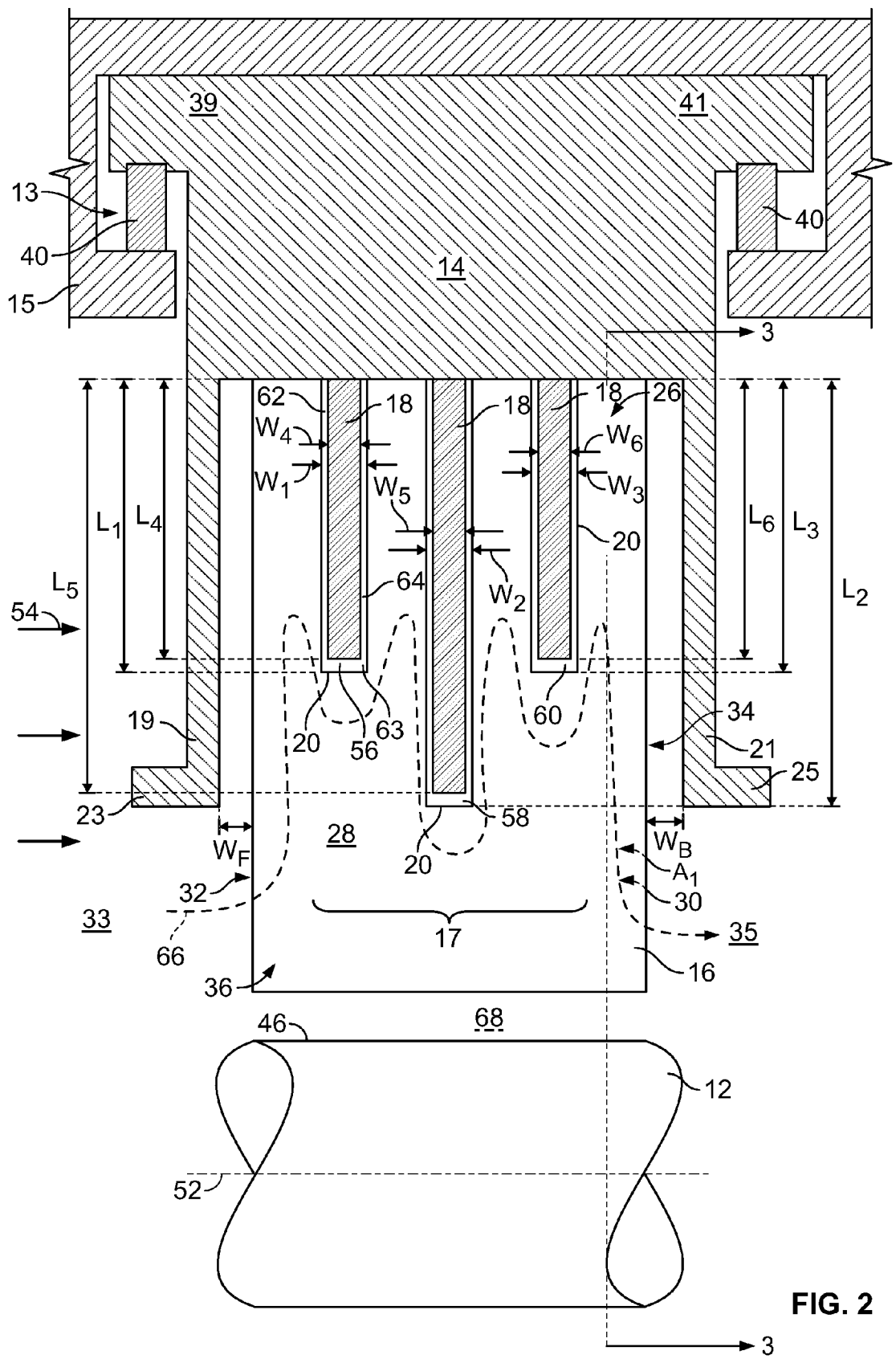
FIG. 2 is a cross-sectional view of the seal assembly shown in FIG. 1 taken along line 2-2.
Figure 3:
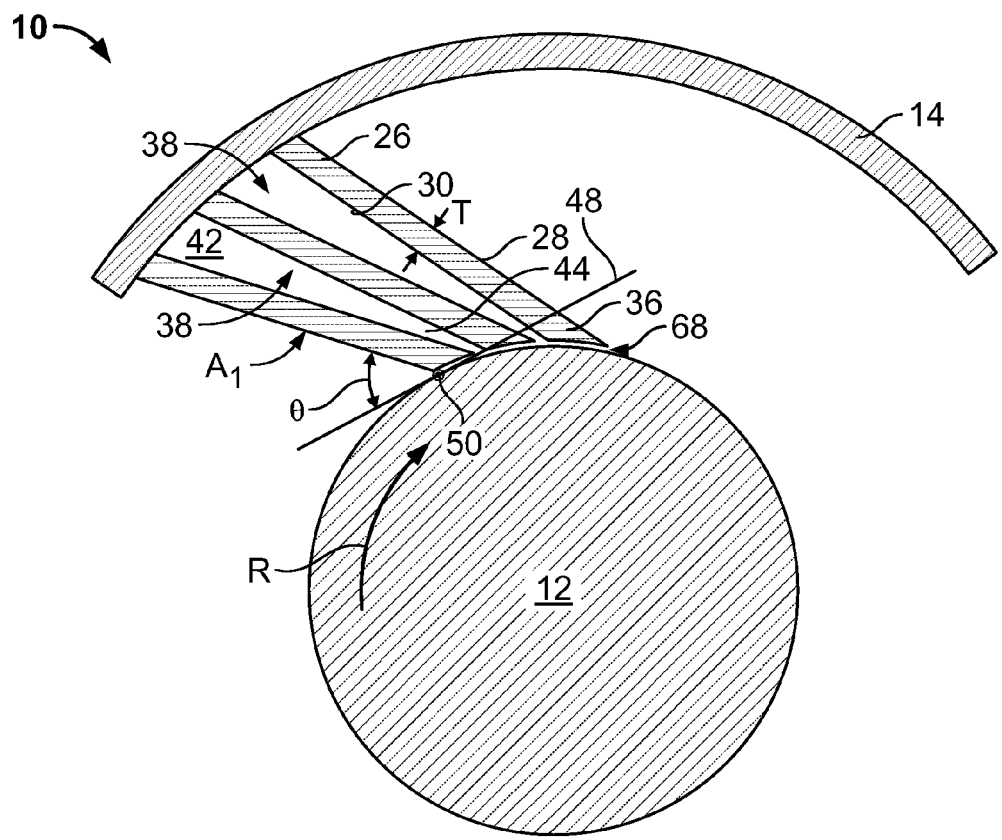
FIG. 3 is a cross-sectional view of the seal assembly shown in FIG. 1 taken along line 3-3 shown in FIG. 2.

The improved compliant plate seal assembly described herein provides a structure that facilitates preventing axial leakage with a geometry that includes features of a labyrinth seal. The compliant plate seal assembly described herein may be used with any suitable rotary machine (not shown), such as, but not limited to, turbomachinery. FIG. 1 is a perspective view of an exemplary compliant plate seal assembly 10. FIG. 2 is a cross-sectional view of seal assembly 10 taken along line 2-2. More specifically, in FIG. 2, seal assembly 10 is illustrated in a radially outward or retracted position, as described herein. Alternatively, seal assembly 10 may be in a radially inward or extended position, as described in more detail below, in which housing 14 is closer to a rotor 12, as compared to when seal assembly 10 is in the retracted position. FIG. 3 is a cross-sectional view of seal assembly 10 taken along line 3-3 shown in FIG. 2.

In the exemplary embodiment, a compliant plate seal assembly 10 facilitates reducing axial leakage between rotor 12, such as a rotating shaft, and a stationary component 15. More specifically, in the exemplary embodiment, housing 14 is coupled to the turbine static shell or stator 15 such that rotor 12 rotates relative to housing 14. Stator 15 may also be referred to herein as a "stationary component." In the exemplary embodiment, housing 14 may be coupled within an annular T-shaped channel 13 defined within stator 15.

Biasing members 40 are coupled between housing 14 and stator 15 to bias compliant plate seal assembly 10 away from rotor 12. Biasing member 40 may be, for example, but not limited to being, a coil spring, a leaf spring, and/or any other biasing mechanism that enables seal assembly 10 to function as described herein. Moreover, in the exemplary embodiment, biasing members 40 are oriented to bias housing 14 radially away from rotor 12 when there is no differential pressure, and to force housing 14 radially towards rotor 12 when a differential pressure overcomes a biasing force of each biasing member 40. Such a housing 14 may be referred to as a "variable clearance positive pressure packing" type housing. In the exemplary embodiment, biasing members 40 are coupled to an upstream projection 39 and to a downstream projection 41 of housing 14. Alternatively, biasing members 40 are coupled between housing 14 and stator 15 at any suitable location that enables seal assembly 10 to function as described herein. Furthermore, although two biasing members are illustrated, seal assembly 10 may include any suitable number of biasing members 40. Alternatively, housing 14 may be rigidly coupled to stator 15.

Additionally, seal assembly 10 may include a front ring 19 and a back ring 21 that substantially enclose seal assembly 10. More specifically, front ring 19 extends circumferentially across member leading surfaces 32 and back ring 21 extends circumferentially across member trailing surfaces 34. In the exemplary embodiment, front ring 19 and/or back ring 21 are formed unitarily with housing 14. Alternatively, front ring 19 and/or back ring 21 are coupled to housing 14 using any suitable coupling technique, fastener, and/or mechanism that enables seal assembly 10 to function as described herein. In the exemplary embodiment, front ring 19 includes an upstream projection 23 and back ring 21 includes a downstream projection 25. Pressure forces act on projections 23 and 25 to move housing 14 radially inward when the differential pressure increases, as described herein. Furthermore, in the exemplary embodiment, a gap 27 is defined between front ring 19 and leading surfaces 32, and a gap 29 is defined between back ring 21 and trailing surfaces 34. In the exemplary embodiment, a width $W_F$ of front gap 27 is not equal to a width $W_B$ of back gap 29. In an alternative embodiment, width $W_F$ is approximately equal to width $W_B$. Further, width WF and/or width WB may be significantly larger than front section 62 and/or back section 64 of gaps 56, 58, and/or 60, as described in more detail below.

The shaft seal assembly 10 is provided with a plurality of compliant plate members 16 secured at their roots 26, in a facing relation (i.e., face-to-face), to housing 14. As used herein, the term "facing relation" refers an orientation in which a first side surface 28 of one compliant plate member 16 is adjacent to a second side surface 30 of an immediate adjacent compliant plate member 16. Each side surface 28 and 30 extends from a leading surface 32 at a high pressure side 33 to a trailing surface 34 at a low pressure side 35 of each compliant plate member 16, and from a root 26 to a tip 36 of each compliant plate member 16. In the exemplary embodiment, each compliant plate member 16 is substantially planar, or flat, along each side surface 28 and 30. Alternatively, compliant plate members 16 may be other than substantially planar, as described in more detail below.

In the exemplary embodiment, when plate members have substantially constant thickness T, a gap 38 is defined between adjacent compliant plate members 16 such that gap 38 is wider at an outer portion 42 than at an inner portion 44. Accordingly, gap 38 tapers from outer portion 42 towards inner portion 44. As such, roots 26 of plate members 16 may be considered to be "loosely packed," and tips 36 may be considered to be "tightly packed." The term "tightly packed," as used herein, refers to an orientation in which adjacent plate tips 36 are not in contact with each other but are closely spaced, for example, but not limited to, being spaced by approximately 0.2 mils. When, for example, seal assembly 10 has a small diameter (not shown), such as, a diameter of less than approximately 8 inches, gaps 38 diverge from inner portion 44 to outer portion 42, and when seal assembly 10 has a larger diameter (not shown), such as, a diameter larger than approximately 15 inches, gaps 38 may be substantially constant from outer portion 42 to inner portion 44. In an alternative embodiment, the thickness T of plate members 16 may vary from root 26 to tip 36, and gaps 38 will vary accordingly.

In the exemplary embodiment, plate members 16 are coupled to housing 14 such that each plate member 16 is oriented at an angle θ (also referred to herein as a "cant angle") relative to a respective tangent plane 48 of rotor 12. The tangent plane 48 is defined at a line 50 on rotor 12 that is proximate to plate tip 36. More specifically, at least one of the side surfaces 28 and/or 30 is oriented at angle θ relative to tangent plane 48. In the exemplary embodiment, cant angle θ is less than 90°. In one embodiment, cant angle θ is between approximately 30° and approximately 60°. In the exemplary embodiment, the cant angle θ is selected to ensure that plate members 16 are angled away from a direction R of rotation of rotor 12 such that the cant angle θ facilitates rotation of rotor 12 within seal assembly 10.

In the exemplary embodiment, compliant plate members 16 each have a substantially rectangular cross-sectional profile. However, in other embodiments, compliant plate members 16 may have a non-rectangular cross-sectional shape, such as a T-shaped cross-sectional shape, a trapezoidal cross-sectional shape, and/or any other suitable shape that enables seal assembly 10 to function as described herein. Furthermore, in the exemplary embodiment, each compliant plate member 16 has a substantially non-planar, axial cross-sectional shape. As used herein, the term "axial cross-section" refers to a cross-section taken at a plane that is substantially perpendicular to a centerline 52 of rotor 12. For example, in one embodiment, compliant plate member 16 includes an elbow (not shown) that extends axially across at least one the first and second side surfaces 28 and 30 and is positioned between tip 36 and root 26 of compliant plate member 16. Alternatively, each compliant plate member 16 may have an axial cross-section that converges or tapers from root 26 to tip 36, an arcuate axial cross-section, and/or any other axial cross-sectional shape that enables seal assembly 10 to function as described herein.

An axial flow resistance member 17 extends at least partially through compliant plate members 16 and facilitates preventing axial leakage flow between gaps 38. More specifically, in the exemplary embodiment, resistance member 17 extends circumferentially about housing 14, and extends radially inward from housing 14 towards rotor 12. In the exemplary embodiment, resistance member 17 includes at least one annular ring 18 that is coupled to housing 14 and extends radially into a circumferential slot 20 defined within each compliant plate member 16. In alternative embodiments, resistance member 17 may include any number of annular rings 18 that enables seal assembly 10 to function as described herein.

Although a housing 14 is shown in the figures and described above, compliant plate members 16 and annular rings 18 may be integrated directly into the stator 15 without housing 14. As such, when compliant plate members 16 and annular ring 18 are formed unitarily with stator 15, stator 15 functions essentially similar to housing 14, as described herein. Additionally, front ring and/or back ring may be omitted from seal assembly 10. More specifically, leading surfaces 32 and/or trailing surfaces 34 of plate members 16 may be exposed at high pressure side 33 and/or low pressure side 35, respectively.

In the exemplary embodiment, each compliant plate member 16 includes a plurality of slots 20 of varying radial lengths $L_1$, $L_2$, and $L_3$. Accordingly, in the exemplary embodiment, axial flow resistance member 17 includes a corresponding number of annular rings 18 that have corresponding radial lengths $L_4$, $L_5$, and $L_6$, respectively. Although in the exemplary embodiment only three annular rings 18 and three respective slots 20 are illustrated, seal assembly 10 may include any suitable number of annular rings 18 and/or slots 20 that enables seal assembly 10 to function as described herein. In the exemplary embodiment, slot lengths $L_1$ and $L_3$ are substantially equal and each is shorter than length $L_2$. Accordingly, ring lengths $L_4$ and $L_6$ are substantially equal and are shorter than ring length $L_5$. Alternatively, lengths $L_1$, $L_2$, $L_3$, $L_4$, $L_5$, and/or $L_6$ may be any relative length that enables seal assembly 10 to function as described herein. Because compliant plate members 16 are packed more tightly at tips 36 than at roots 26, in the exemplary embodiment, annular rings 18 need not extend radially through tips 36 of compliant plate members 16. Rather, annular rings 18 need only extend into a portion of each compliant plate member 16. In some embodiments, adjacent circumferential slots 20 have different radial lengths $L_1$, $L_2$, and/or $L_3$ with the static annular rings 18 extending radially into the circumferential slots 20.

Furthermore, in the exemplary embodiment, each slot 20 and each annular ring 18 has a substantially constant width $W_1$, $W_2$, $W_3$, $W_4$, $W_5$, and $W_6$, respectively. In alternative embodiments, widths $W_1$, $W_2$, $W_3$, $W_4$, $W_5$, and/or $W_6$ may taper from tip 36 to root 26, and/or may widen from tip 36 to root 26. As such, in alternative embodiments, annular rings 18 and/or slots 20 may be trapezoidally-shaped. Alternatively, widths $W_1$, $W_2$, $W_3$, $W_4$, $W_5$, and/or $W_6$ may be of any size that enables seal assembly 10 to function as described herein. Moreover, in the exemplary embodiment, slot lengths $L_1$, $L_2$, and $L_3$ are longer than respective ring lengths $L_4$, $L_5$, and $L_6$, and slot widths $W_1$, $W_2$, and $W_3$ are wider than respective ring widths $W_4$, $W_5$, and $W_6$ such that a respective gap 56, 58, and 60 is defined between each annular ring 18 and slot 20. In the exemplary embodiment, each gap 56, 58, and 60 includes a front section 62, a bridge section 63, and a back section 64.

In the exemplary embodiment, dimensions of gaps 56, 58, and 60 are selected based on predetermined hydrostatic lift and/or hydrostatic blowdown conditions. For example, front section 62 of gap 56 may decrease while back section 64 of gap 56 increases. Such a gap configuration may cause hydrostatic blowdown. As used herein, the term "blowdown" refers to a radially inward deflection of compliant plate members 16 under a pressure loading. In an alternative embodiment, front section 62 of gap 56 may be larger than back section 64 of gap 56. Such a gap configuration may cause lift on plate members 16. Although only gap 56 is described in more detail, it will be understood gaps 58 and 60 are configured essentially similar to gap 56. In the exemplary embodiment, compliant plate members 16 experience an effective blowdown force near front section 62 and an effective lift force near back section 64, wherein front and back sections 62 and 64 are closer to each other as compared to known compliant plate seal assemblies. Because of the reduced distance between gap sections 62 and 64, the blowdown and lift forces are also closer to each other as compared to forces experience within known compliant plate seal assemblies. By reducing the distance between forces, twisting torque acting on each compliant plate member 16 is facilitated to be reduced, as compared to known compliant plate seal assemblies.

Additionally, during operation of rotor 12, annular rings 18 facilitate channeling the leakage flow 54 along a tortuous path 66, thereby increasing the resistance of seal assembly 10 to leakage flow 54. The path 66 thus mimics a labyrinth seal within compliant plate seal assembly 10. Moreover, compliant plate members 16 retain their bending flexibility and axial stiffness such that seal assembly useful life and functionality are facilitated to be enhanced. An important advantage of compliant plate seal assembly 10 is a pressure build-up effect that is generated upon rotor rotation. Such an effect causes the compliant plate members 16 to lift during rotor rotation. As a result of this lift, in addition to other pressure forces induced to compliant plate members 16, and the inherent natural elasticity of compliant plate members 16, an equilibrium state is attained for each compliant plate member 16 that facilitates reducing a clearance 68 between tips 36 of compliant plate members 16 and rotor 12. The reduced clearance 68 between the tips 36 and rotor 12 facilitates reducing frictional heat generation by substantially minimizing or eliminating physical contact between tips 36 and rotor 12. The reduced clearance 68 provides resistance to a leakage flow in an axial direction.

Figure 4:
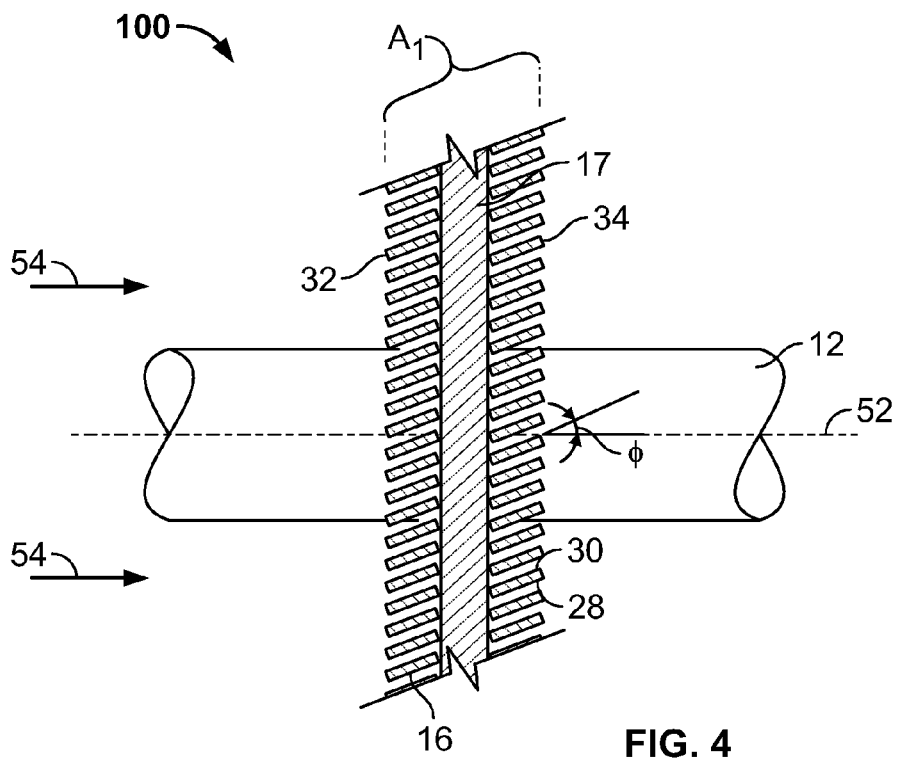
FIG. 4 is a partial, schematic plan view of an alternative compliant plate seal assembly.

FIG. 4 is a partial, schematic plan view of an alternative compliant plate seal assembly 100. Compliant plate seal assembly 100 is substantially similar to compliant plate seal assembly 10 with the exception that compliant plate members 16 of compliant plate seal assembly 100 are at an angle φ with respect to a centerline 52 of rotor 12. As such, like components are referred to with the same reference number.

More specifically, in the alternative embodiment, plate members 16 are coupled to housing 14 (shown in FIGS. 1-3) such that each plate member 16 is oriented at an angle φ with respect to a centerline 52 of rotor 12. In one embodiment, angle φ is greater than approximately 0° and less than approximately 90°. As such, the leading surface 32 and the trailing surface 34 of plate member 16 are skewed with respect to centerline 52. Orienting members 16 at angle φ facilitates increasing the amount of surface area $A_1$ of second side surfaces 30 of each plate member 16 that is exposed to the axial flow path 54, as compared to plate members 16 that are substantially aligned with centerline 52. However, in the exemplary embodiment shown in FIGS. 1-3, plate members 16 are substantially aligned with centerline 52 such that angle φ is approximately 0°.

By orienting plate members 16 at angle φ, blowdown and lift can be made self-correcting. More specifically, in compliant plate seal assembly 100, the hydrostatic lift and/or blowdown forces acting on the compliant plate members 16 are a function of the pressure distribution on adjacent side surfaces 28 and 30 of adjacent compliant plate members 16. The pressure distribution on the adjacent side surfaces 28 and 30 depends on front and back sections 62 and 64 (shown in FIG. 2), respectively, of gaps 56, 58, and/or 60 (shown in FIG. 2) between annular rings 18 (shown in FIGS. 1 and 2) and compliant plate members 16. As discussed above, when front section 62 is smaller than back section 64, hydrostatic blowdown is caused, whereas when back section 64 is smaller than front section 62, a pressure distribution leads to hydrostatic lift.

Because, in the alternative embodiment, compliant plate members 16 are inclined at angle φ with respect to centerline 52, lifting of compliant plate members 16, i.e., plate members 16 being forced radially outwardly, will cause front section 62 of gap 56, 58, and/or 60 to narrow and back section 64 of gap 56, 58, and/or 60 to widen. As front section 62 narrows and back section 64 widens, the pressure distribution will change to cause a hydrostatic blowdown on the compliant plate members 16. Such a feedback response by gaps 56, 58, and/or 60 will facilitate preventing excessive lift of compliant plate members 16, which may cause excessive leakage. The feedback response of gaps 56, 58, and/or 60 also facilitates preventing excessive blowdown of compliant plate members 16, which may cause wear due to contact between compliant plate members 16 and rotor 12. As such, angle φ facilitates ensuring that clearance 68 (shown in FIGS. 2 and 3) is maintained between tips 36 (shown in FIGS. 1-3) of compliant plate members 16 and rotor 12 such that seal assembly 100 has non-contact operation and low leakage.

Figure 5:
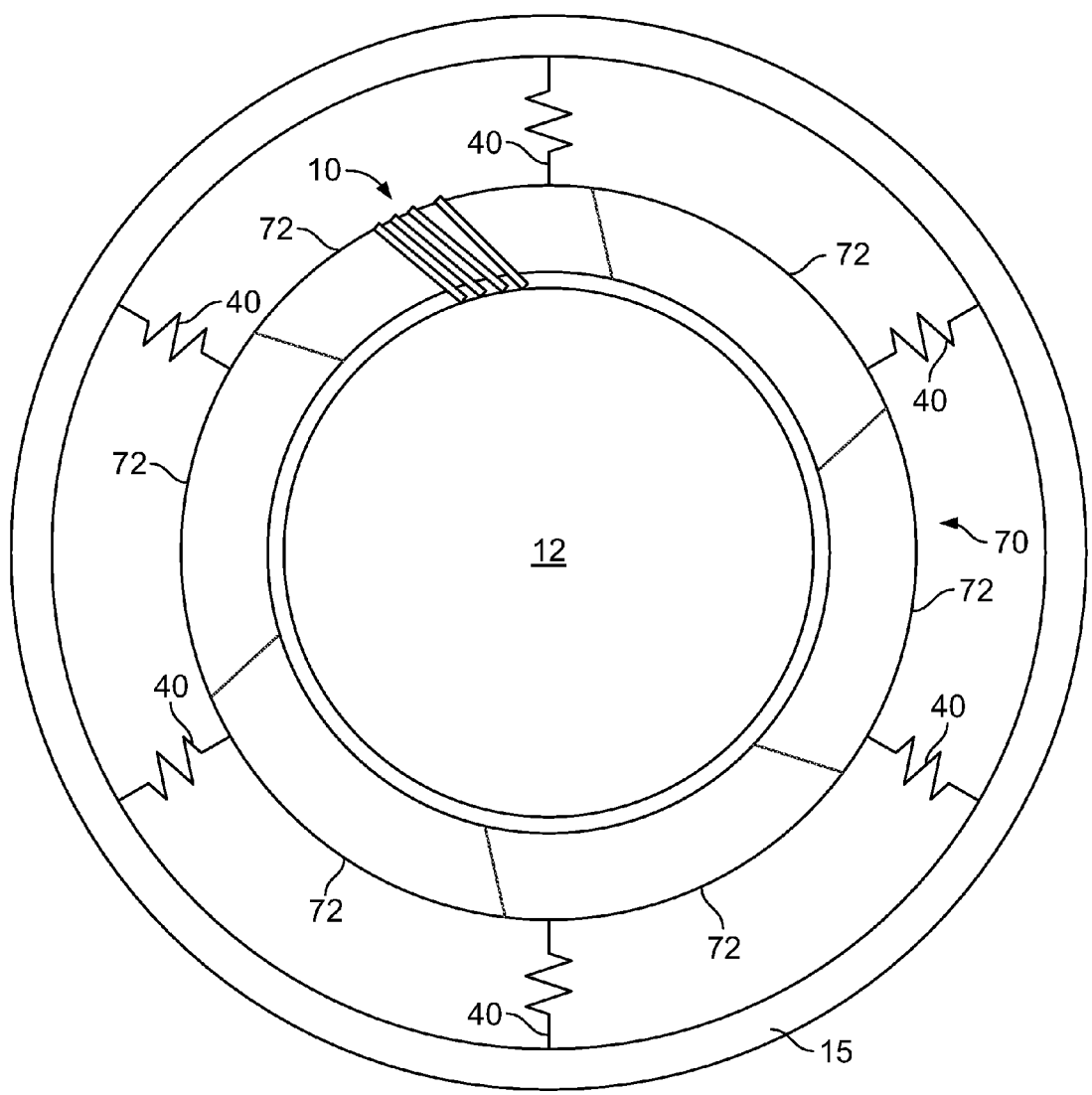
FIG. 5 is a schematic cross-sectional view of an exemplary housing that may be used with the compliant plate seal assembly shown in FIG. 1.

FIG. 5 is a schematic cross-sectional view of an exemplary housing 70 that may be used with compliant plate seal assembly 10. Components of housing 70 that are similar to components of housing 14 are identified with the same reference numerals.

In the exemplary embodiment, housing 70 is fabricated from a plurality of segments 72 that each include a seal assembly 10, as described above. Segments 72 are coupled circumferentially about rotor 12 to form housing 70. Furthermore, each segment 72 is coupled adjacent to another segment 72 using, for example, but not limited to using, keys, shims, C-seals, E-Seals, W-Seals and/or any other device that enables housing 70 to function as described herein. In the exemplary embodiment, each segment 72 includes biasing member 40. More specifically, in the exemplary embodiment, each biasing member 40 is coupled between stator 15 and a respective housing segment 72. As such, each biasing member 40 enables each respective seal assembly 10 to adjust to rotational transients, thermal transients, and/or any other circumferential deviations. More specifically, in the exemplary embodiment, biasing members 40 are oriented to bias segments 72 radially away from rotor 12 when there is no differential pressure, and to force segments 72 radially towards rotor 12 when a differential pressure overcomes a biasing force of each biasing member 40. Although, in the exemplary embodiment, each segment 72 includes only one biasing member 40, alternatively, each segment 72 may include more than one biasing member 40 and/or no biasing member 40.

Figure 6:
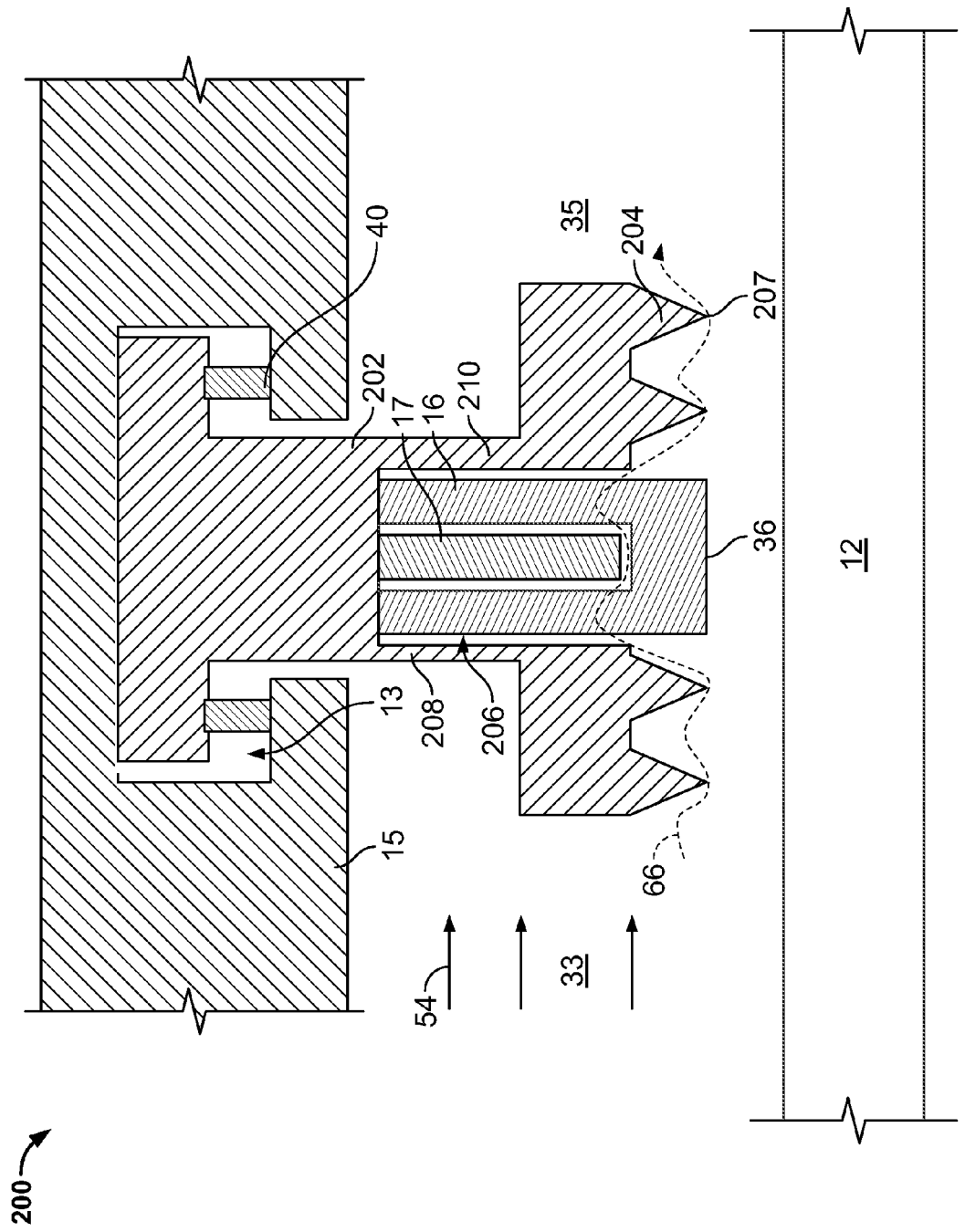
FIG. 6 is a cross-sectional view of an another alternative compliant plate seal assembly.

FIG. 6 is a cross-sectional view of an alternative compliant plate seal assembly 200. Compliant plate seal assembly 200 is substantially similar to compliant plate seal assembly 10, as described above, with the exception that compliant plate seal assembly 200 includes a labyrinth seal 202 instead of housing 14, as described above. As such, like components are referred to with the same reference number. Furthermore, in FIG. 6, seal assembly 200 is illustrated in a radially outward or retracted position, as described herein. Alternatively, seal assembly 200 may be in a radially inward or extended position, as described herein, in which compliant plate members 16 are closer to a rotor 12, as compared to when seal assembly 200 is in the retracted position.

In the exemplary embodiment, labyrinth seal 202 includes a plurality of teeth 204 that are spaced axial along rotor 12. At least one tooth 204 is omitted and an annular compliant plate seal 206, including compliant plates 16 having resistance member 17 extending therethrough, is coupled to labyrinth seal 202. More specifically, in the exemplary embodiment seal 206 is coupled to labyrinth seal 202 at a central location such that teeth 204 are positioned upstream and downstream from annular seal 206. Alternatively, annular seal 206 is coupled to labyrinth seal 202 at any suitable location that enables seal assembly 200 to function as described herein. In the exemplary embodiment, tips 36 of compliant plate member 16 extend beyond tips 207 of teeth 204. More specifically, tips 36 of compliant plate member 16 extend further radially inward than tips 207 of teeth 204. In an alternative embodiment, tips 207 of teeth 204 are substantially co-planar with tip 36 of compliant plate member 16. Furthermore, seal assembly 200 may include any suitable number and/or configuration of teeth 204 that enables seal assembly 200 to function as described herein. Additionally, in the exemplary embodiment, a front portion 208 of labyrinth seal 202 is substantially similar to front plate 19, and a back portion 210 of labyrinth seal 202 is substantially similar to back plate 21, as described above. Although labyrinth seal 202 is described herein, plates 16 and resistance member 17 may be coupled to any suitable standard seal.

The above-described seal assembly creates a high-pressure dynamic seal between a rotating component and a static component. The seal assembly includes multiple compliant plates that substantially comply in the event of rotor excursion, but are stiff along the direction of pressure drop. Incorporation of an axial flow resistance member forces the axial flow to follow a tortuous path at the seal root. The combination of tightly-packed seal tips and flow-obstructing features at the seal root results in significantly reducing axial leakage. Furthermore, the above-described seal assembly is able to combined with various kinds of standard seals, for example, labyrinth seals, honeycomb seals, brush seals, and/or abradable seals.

In addition, the orientation of the compliant plate members, with respect to the stator and/or the rotor, facilitates increasing the amount of surface area of each compliant plate member exposed to the leakage flow path. As such, the effectiveness of the seal assembly is facilitated to be increased as compared to seal assemblies having leaves coupled in other orientations. Moreover, the biasing members enable the position of the seal assembly to vary with respect to the stator such that wear at the tips of the compliant plate members is facilitated to be reduced, as compared to seal plates that repeatedly contact the rotor.

Exemplary embodiments of a compliant plate seal assembly for use with turbomachinery are described above in detail. The compliant plate seal assemblies described herein are not limited to the specific embodiments described herein, but rather, components of the compliant plate seal assemblies may be utilized independently and separately from other components described herein. For example, the compliant plate seal assemblies may be used in combination with other rotary machines, and are not limited to being used with only the turbomachinery and operations thereof, as described herein. Rather, the present invention can be implemented and utilized in connection with many other sealing applications.

While the invention has been described in terms of various specific embodiments, those skilled in the art will recognize that the invention can be practiced with modification within the spirit and scope of the claims.

What is claimed is:

1. A method of assembling a turbomachine including a rotor and a stationary component, said method comprising:
   coupling a housing to the stationary component using at least one biasing member, the housing extending circumferentially about the rotor;
   coupling at least one annular ring to the housing; and
   coupling a plurality of plate members to the housing, each of the plurality of plate members comprises a tip, a root, and opposing first and second side surfaces that extend between the tip and the root, such that the at least one annular ring extends from the housing towards the rotor and partially through the plurality of plate members from an outermost root edge towards the tip, wherein the outermost root edge extends from the first and second side surface.

2. A method in accordance with claim 1 wherein coupling a housing to the stationary component further comprises coupling a plurality of segments together to form a portion of the housing.

3. A method in accordance with claim 1 wherein coupling a plurality of plate members further comprises coupling each of the plurality of plate members at a predetermined angle relative to a centerline of the rotor.

4. A method in accordance with claim 1 wherein coupling a plurality of plate members further comprises coupling each of the plurality of plate members at a predetermined angle relative to at least one plane that is tangential to the rotor.

5. A method in accordance with claim 1 wherein coupling a plurality of plate members further comprises coupling the plurality of plate members to the plurality of segments such that a gap is defined between a portion of each of the plurality of plate members and the at least one annular ring.

6. A method in accordance with claim 1 wherein coupling a housing to the stationary component further comprises coupling the at least one biasing member against the housing to bias the housing away from the rotor.

7. A method in accordance with claim 1 wherein coupling a housing to the stationary component further comprises coupling a housing to the stationary component, wherein the housing includes a labyrinth seal.

8. A seal assembly for use with a rotor, said seal assembly comprising:
 a housing coupled to a stationary component;
 at least one biasing member coupled between said housing and said stationary component;
 a resistance member coupled to said housing, said resistance member comprising at least one annular ring extending from said housing towards the rotor; and
 a plurality of plate members coupled circumferentially about said housing, each of said plurality of plate members comprises a tip, a root, and opposing first and second side surfaces that extend between said tip and said root, said at least one annular ring extends a distance through each of said plurality of plate members from an outermost root edge towards said tip, wherein said outermost root edge extends from said first and second side surfaces.

9. A seal assembly in accordance with claim 8 wherein said housing comprises a plurality of arcuate segments coupled together.

10. A seal assembly in accordance with claim 9 wherein said side surfaces of said plurality of plate members are each oriented at a predetermined angle relative to at least one plane that is tangential to the rotor.

11. A seal assembly in accordance with claim 8 wherein each of said plurality of plate members is coupled to said housing such that at least one of said first side surface and said second side surface is at a predetermined angle relative to a centerline of the rotor.

12. A seal assembly in accordance with claim 8 wherein said first side surface and said second side surface each extend from a leading surface at a high pressure side of each of said plurality of plate members to a trailing surface at a low pressure side of each of said plurality of plate members.

13. A turbomachine comprising:
 a stationary component;
 a rotor coupled adjacent to said stationary component; and
 a seal assembly coupled between said stationary component and said rotor, said seal assembly comprising:
  a housing coupled to said stationary component;
  a biasing member coupled between said housing and said stationary component;
  a resistance member coupled to said housing, said resistance member comprising at least one annular ring extending from said housing towards said rotor; and
  a plurality of plate members coupled circumferentially about said housing, each of said plurality of plate members comprises a tip, a root, and opposing first and second side surfaces that extend between said tip and said root, said at least one annular ring extends a distance through each of said plurality of plate members from an outermost root edge towards said tip, wherein said outermost root edge extends from said first and second side surfaces.

14. A turbomachine in accordance with claim 13 wherein said housing comprises a plurality of arcuate segments coupled together.

15. A turbomachine in accordance with claim 14 wherein each of said plurality of segments comprises said biasing member coupled thereto, said biasing member coupled to said stationary component.

16. A turbomachine in accordance with claim 13 wherein said side surfaces of said plurality of plate members are each oriented at a predetermined angle relative to at least one plane that is tangential to said rotor.

17. A turbomachine in accordance with claim 13 wherein each of said plurality of plate members is coupled to said housing such that at least one of said first side surface and said second side surface is at a predetermined angle relative to a centerline of said rotor.

18. A turbomachine in accordance with claim 13 wherein a gap is defined between each of said plurality of plate members and said resistance member.

* * * * *